United States Patent
Ozawa et al.

(10) Patent No.: US 7,105,238 B2
(45) Date of Patent: Sep. 12, 2006

(54) MASTER INFORMATION CARRIER FOR MAGNETIC TRANSFER

(75) Inventors: Takako Ozawa, Odawara (JP); Masakazu Nishikawa, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/635,640

(22) Filed: Aug. 7, 2003

(65) Prior Publication Data

US 2004/0033389 A1    Feb. 19, 2004

(30) Foreign Application Priority Data

Aug. 14, 2002 (JP) .............................. 2002-236647

(51) Int. Cl.
*G11B 5/86* (2006.01)
(52) U.S. Cl. ................ 428/826; 428/848.2; 428/848.5; 360/16
(58) Field of Classification Search ................ 428/692; 360/16, 17
See application file for complete search history.

(56) References Cited

U.S. PATENT DOCUMENTS

| | | | |
|---|---|---|---|
| 2002/0034028 A1* | 3/2002 | Nishikawa et al. | ........... 360/17 |
| 2002/0051306 A1* | 5/2002 | Nishikawa et al. | ........... 360/17 |
| 2002/0098387 A1* | 7/2002 | Tsubata et al. | ....... 428/694 SG |
| 2003/0143432 A1* | 7/2003 | Nakamikawa et al. | ...... 428/694 BA |

FOREIGN PATENT DOCUMENTS

| | | |
|---|---|---|
| JP | 63-183623 A | 7/1988 |
| JP | 10-40544 A | 2/1998 |
| JP | 10-269566 A | 10/1998 |
| JP | 2001-14667 A | 1/2001 |

* cited by examiner

*Primary Examiner*—Kevin M. Bernatz
(74) *Attorney, Agent, or Firm*—Sughrue Mion, PLLC

(57) ABSTRACT

A master information carrier has on its surface an irregularity pattern representing information to be magnetically transferred to a magnetic recording medium held in contact with the surface of the master information carrier. The parts of the surface of the master information carrier which is brought into contact with the magnetic recording medium are in the range of 0.3 nm to 10.0 nm in center plane mean surface roughness SRa.

13 Claims, 2 Drawing Sheets

MASTER INFORMATION CARRIER FOR MAGNETIC TRANSFER

BACKGROUND OF THE INVENTION

1. Field of the Invention

Figure 1A:
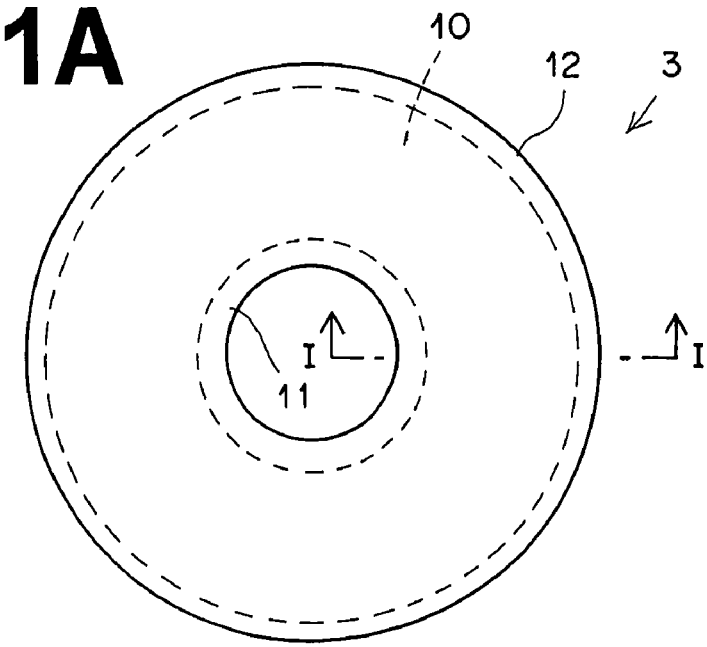

This invention relates to a master information carrier for magnetic transfer carrying thereon an irregularity pattern representing information to be transferred to a magnetic recording medium.

2. Description of the Related Art

With an increase in information quantity, there is a demand for a magnetic recording medium which is high in memory capacity, low in cost and preferably requires a short time to read out a necessary part of data (a magnetic recording medium which allows so-called high-speed access). As an example of such a magnetic recording medium, there has been known a high recording density magnetic medium such as a hard disc, a zip (Iomega) and the like. In such a high recording density magnetic medium, the recording area is formed by narrow data tracks. In order to cause a magnetic head to accurately trace such narrow data tracks and reproduce the data at a high S/N ratio, the so-called servo tracking technique has been employed.

In order to perform the servo tracking, it is necessary to write servo information such as servo tracking signals for positioning the data tracks, address signals for the data tracks and reproduction clock signals on the magnetic recording medium as a preformat upon production thereof. At present, such preformat recording is performed by the use of a specialized servo recording apparatus (a servo track writer) However, the preformat recording by the conventional servo recording apparatus is disadvantageous in that it takes a long time since the servo information must be recorded on the magnetic recording medium one by one by the use of a magnetic head, which deteriorates the productivity.

As a method of recording the preformat accurately and efficiently, there has been proposed, for instance, in Japanese Unexamined Patent Publication Nos. 63(1988)-183623, 10(1998)-40544 and 10(1998)-269566, a magnetic transfer method in which a pattern which is formed on a master information carrier and represents servo information is copied to a magnetic recording medium (a slave medium) by magnetic transfer.

In the magnetic transfer, the magnetization pattern representing the information carried by a master information carrier is magnetically transferred from the master information carrier to a magnetic recording medium (a slave medium) by applying a transfer magnetic field to the slave medium and the master information carrier in close contact with each other, and accordingly, the information carried by the master information carrier can be statically recorded on the slave medium with the relative position between the master information carrier and the slave medium kept constant. Thus, according to the magnetic transfer, the preformat recording can be performed accurately and the time required for the preformat recording is very short.

We, this applicant, have proposed in Japanese Unexamined Patent Publication No. 2001-14667 a method of magnetic transfer in which the magnetization pattern on a master information carrier is magnetically transferred to the magnetic layer of a slave medium by forming the magnetic layer on the surface of the protruding portions of the master information carrier of soft magnetic material which is small in coercive force, initially DC-magnetizing the magnetic layer of the slave medium in one direction of the recording tracks and applying a transfer magnetic field to the slave medium in the direction opposite to the direction of the initial-DC-magnetization with the magnetic layer of the slave medium held in close contact with the soft magnetic layer of the master information carrier.

In order to improve the transfer quality (the quality of the signal transferred to the slave medium), it is necessary to uniform the space between the master information carrier and the slave medium. Since it is difficult to uniformly space the master information carrier and the slave medium over the entire area of the slave medium, the master information carrier and the slave medium are generally brought into close contact with each other. Also in the case where the master information carrier and the slave medium are brought into close contact with each other, it is important to uniformly brought into close contact with each other over the entire area. That is, when the slave medium is unsatisfactorily brought into close contact with the master information carrier at a part, the intensity of the magnetic field becomes non-uniform in the transfer magnetic field around the part and non-uniformity of magnetization can occur in an area of magnetic transition or in an area of magnetic uniformity. As a result, the quality of the transferred signal deteriorates and in the case where the signal to be transferred is a servo signal, satisfactory tracking function cannot be obtained on the slave medium, which deteriorates the reliability of the slave medium.

SUMMARY OF THE INVENTION

In view of the foregoing observations and description, the primary object of the present invention is to provide a master information carrier which can suppress transfer defect such as signal drop-out in the slave medium transferred with a magnetization pattern by magnetic transfer and improve the quality of the transferred signal.

In accordance with the present invention, there is provided a master information carrier having on a surface thereof an irregularity pattern representing information to be magnetically transferred to a magnetic recording medium held in contact with the surface of the master information carrier, wherein the improvement comprises that the parts of the surface of the master information carrier which is brought into contact with the magnetic recording medium are in the range of 0.3 nm to 10.0 nm in center plane mean surface roughness SRa.

The "center plane mean surface roughness SRa" is a three-dimensional mean roughness to a center plane (a plane which defines the same volumes on opposite sides thereof together with the profile of the master information carrier) and is obtained by averaging deviations from the center plane as represented by the following formula.

$$SRa = \frac{1}{LxLy}\int_0^{Ly}\int_0^{Lx} |f(x,y)| dxdy$$

wherein Lx and Ly represents the dimensions of the surface in x- and y-directions and f(x,y) represents a roughness surface to the center plane.

The center plane mean surface roughness SRa is preferably in the range of 0.5 nm to 5.0 nm and more preferably in the range of 0.5 nm to 3.0 nm.

The "the parts of the surface of the master information carrier which are brought into contact with the magnetic recording medium" include not only the protruding portions of the irregularity pattern but also a part which is not provided with the irregularity pattern but brought into contact with the magnetic recording medium.

In the case where the master information carrier comprises a substrate and a magnetic layer formed at least on the protruding portion of the irregularity pattern on the substrate, the center plane mean surface roughness SRa can be controlled by controlling magnetic layer forming conditions such as the flow rate of Ar, the output power and/or the film forming thickness during sputtering. For example, when the flow rate of Ar during sputtering is increased, the center plane mean surface roughness SRa can be increased, whereas when the flow rate of Ar during sputtering is decreased, the center plane mean surface roughness SRa can be decreased. When the film forming thickness is increased, the surface is more roughened, and when the film forming thickness is decreased, the surface is smoothened.

Further, in the case where the irregularity pattern of the substrate of the master information carrier is formed in the steps including patterning of photoresist by lithography and removal (washing) of photoresist, residual photoresist remaining on parts which finally become top surfaces of the protruding portions affects the center plane mean surface roughness of the top surfaces of the protruding portions, and accordingly, the center plane mean surface roughness SRa can be controlled by controlling the degree of washing of the photoresist. For example, by enhancing the degree of washing of the photoresist, the center plane mean surface roughness SRa can be reduced.

When the parts of the surface of the master information carrier which are brought into contact with the magnetic recording medium is in the range of 0.3 nm to 10.0 nm in center plane mean surface roughness SRa, the slave medium and the master information carrier can be uniformly brought into close contact with each other and non-uniformity in transferred magnetization and deterioration in linearity of transferred magnetization can be prevented, whereby excellent transfer recording properties can be obtained.

That is, when the parts of the surface of the master information carrier which are brought into contact with the magnetic recording medium is larger than 10.0 nm in center plane mean surface roughness SRa, the master information carrier cannot be brought into satisfactory close contact with the slave medium and a transfer magnetic field distribution is generated, which causes transfer defect and deteriorates the quality of transfer. Whereas when the parts of the surface of the master information carrier which are brought into contact with the magnetic recording medium is smaller than 0.3 nm in center plane mean surface roughness SRa, air traps can be generated when the master information carrier is brought into close contact with the slave medium and a local transfer magnetic field distribution is generated, which causes transfer defect and deteriorates the quality of transfer.

BREIF DESCRIPTION OF THE DRAWINGS

Figure 1B:
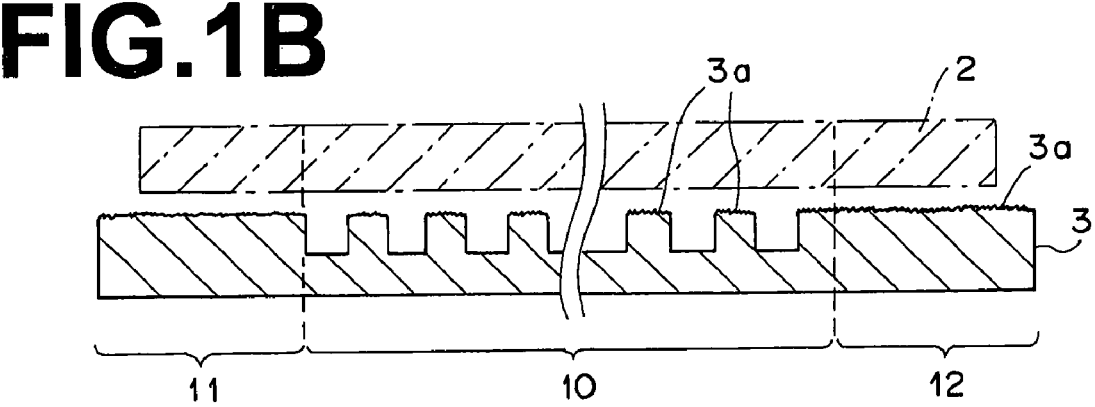
Figure 2:
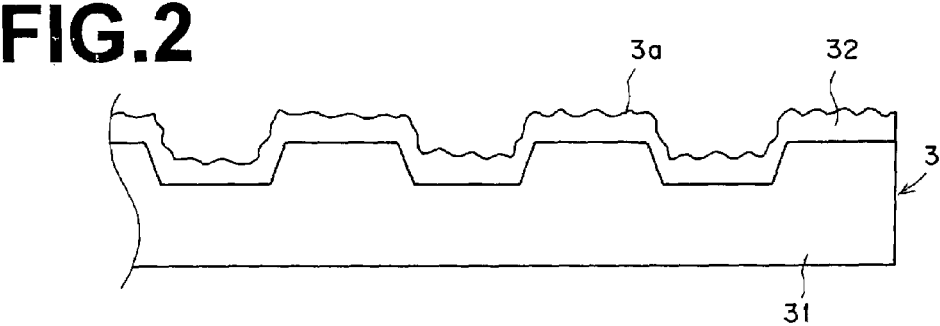
Figure 3A:
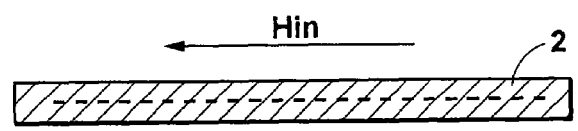
Figure 3B:
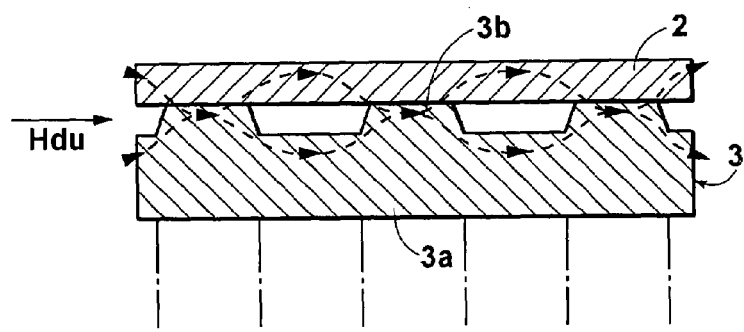
Figure 3C:
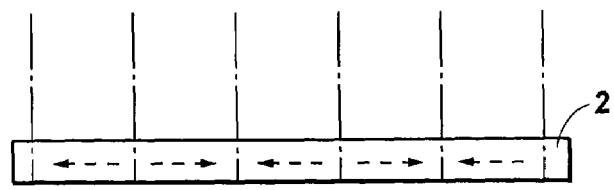

FIG. 1A is a plan view showing a master information carrier in accordance with a first embodiment of the present invention, FIG. 1B is a cross-sectional view taken along line I—I in FIG. 1A, FIG. 2 is a fragmentary cross-sectional view of a master information carrier in accordance with a second embodiment of the present invention, and FIGS. 3A to 3C are views for illustrating the basic steps of magnetic transfer.

DESCRIPTION OF THE PREFERRED EMBODIMENT

In FIGS. 1A and 1B, a master information carrier 3 in accordance with a first embodiment of the present invention is provided with an irregularity pattern representing information to be transferred to slave media. The information represented by the irregularity pattern is transferred to the slave media by applying a magnetic field to the master information carrier 3 and the slave medium held in close contact with each other. The parts 3a of the surface of the master information carrier which are brought into contact with the magnetic recording medium (will be referred to as "the contact parts 3a", hereinbelow) are in the range of 0.3 nm to 10.0 nm in center plane mean surface roughness SRa. When the center plane mean surface roughness SRa of the contact parts 3a is larger than 10.0 nm or smaller 0.3 nm, the master information carrier and the slave medium cannot be brought into satisfactory close contact with each and the quality of the transferred signal deteriorates.

The master information carrier 3 may be formed of any suitable material or by any suitable method so long as the center plane mean surface roughness SRa of the contact parts 3a is not smaller than 0.3 nm and not larger than 10.0 nm.

As shown in FIG. 1A, the master information carrier 3 is like a disc. The inner and outer areas 11 and 12 are non-transfer areas carrying thereon no information to be transferred to the slave medium, and the donut-like area circumscribed the dotted line between the inner and outer non-transfer areas 11 and 12 is a transfer area 10 where an irregularity pattern representing information to be transferred to the slave medium is formed.

As shown in FIG. 1B, the non-transfer areas 11 and 12 are substantially flush with the upper surfaces of the protruding portions of the irregularity pattern formed in the transfer area 10. Accordingly, the inner and outer non-transfer areas 11 and 12 are bought into contact with the slave medium 2 as well as the upper surfaces of the protruding portions of the irregularity pattern. That is, the contact parts 3a include the inner and outer non-transfer areas 11 and 12 as well as the upper surfaces of the protruding portions of the irregularity pattern. Though the slave medium 2 is spaced upward from the master information carrier 3 in FIG. 1B, actually the slave medium 2 is held in close contact with the master information carrier 3 when a magnetic field is applied and the magnetic transfer is carried out. The slave medium 2 is, for instance, a magnetic recording disc such as a hard disc or a flexible disc, and information represented by the irregularity pattern in the transfer area 10 is magnetically transferred to the track area corresponding to the transfer area 10, whereby a magnetization pattern representing the information is formed on the slave medium 2.

Production of the master information carrier will be described, hereinbelow. The substrate of the master information carrier may be formed, for instance, of, nickel, silicon, glass, quartz, aluminum, alloys, ceramics, synthetic resin or the like. The irregularity pattern or the pattern of the protruding portions can be formed, for instance, by the use of stamper method or photolithography.

An example of production of the master information carrier where the irregularity pattern is formed by a stamper method will be described, hereinbelow. A photoresist solution is applied to a disc of glass or quartz having a smooth surface by spin coating, thereby forming a photoresist layer. Thereafter, a laser beam (or an electron beam) modulated according to the information to be transferred such as a servo signal is caused to scan the disc with the photoresist layer, while rotating the disc, to expose the photoresist over the entire area thereof along the tracks in a predetermined pattern, e.g., a pattern corresponding to a servo signal comprising a plurality of linear parts radially extending from the center of rotation of the tracks.

Then, the photoresist is developed and is removed from the areas exposed to the beam, whereby an original carrying thereon an irregularity pattern of the photoresist is obtained. Then plating (electroforming) is applied to the original and an nickel substrate having a positive irregularity pattern following the original is obtained. Thereafter, the nickel substrate is peeled off the original. The nickel substrate may be used as a master information carrier as it is or after forming a soft magnetic layer and/or a protective layer on the irregularity pattern.

Otherwise, the original may be plated to form a second original and the second original may be plated to form a metal disc having a negative irregularity pattern. Further, a third original may be formed by plating the second original or pressing a resin syrup against the surface of the second original and curing the resin syrup, and a metal disc having a positive irregularity pattern may be formed by plating the third original.

Whereas, an original may be obtained by etching the disc after the disc is provided with a photoresist pattern to form holes through the disc and removing the photoresist. Thereafter, a substrate can be obtained from the original in the same manner as described above.

The metal substrate may be formed of Ni or Ni alloys. The metal substrate may be formed by various metal film forming techniques including electroless plating, electroforming, sputtering, and ion plating. The depth of the irregularity pattern (the height of the protrusions) of the metal substrate is preferably 50 nm to 800 nm, and more preferably 80 nm to 600 nm. The irregularity pattern or the pattern of protruding portions or recessed portions is elongated in a radial direction of the master information carrier when the information to be transferred is a servo signal, and the lengths in the radial direction and the circumferential direction are preferably in the ranges of 0.05 to 20 µm and 0.05 to 5 µm. It is preferred as an irregularity pattern representing a servo signal that the length in the radial direction is larger than that in the circumferential direction in the ranges described above.

In the case where the substrate is of ferromagnetic material such as Ni, the magnetic transfer can be carried out even if the irregularity pattern is not provided with a magnetic layer. However, by providing a magnetic layer which is better in magnetic transfer properties, better magnetic transfer can be carried out. In the case where the substrate of the master information carrier 3 is of non-magnetic material, it is necessary to provide a magnetic layer.

As the magnetic layer, a soft magnetic layer or a semi-hard magnetic layer which is large in coercive force is preferred and the magnetic layer is formed by, for instance, vacuum film forming techniques such as sputtering or ion plating or plating. As the magnetic material, Co, Co alloys (e.g., CoNi, CoNiZr, or CoNbTaZr), Fe, Fe alloys (e.g., FeCo, FeCoNi, FeNiMo, FeAlSi, FeAl, or FeTaN), Ni or Ni alloys (e.g., NiFe) can be employed. FeCo and FeCoNi are especially preferred. The thickness of the magnetic layer is preferably 50 nm to 500 nm, and more preferably 150 nm to 400 nm.

It is preferred that a 5 to 30 nm thick protective film such as of DLC (diamond-like carbon) be provided on the magnetic layer. A lubricant layer may be further provided. A reinforcement layer such as a Si layer may be provided between the magnetic layer and the protective film to enhance the contact therebetween.

A master information carrier may be formed by forming a resin substrate by the use of the original produced in the manner described above and providing a magnetic layer on the surface of the resin substrate. As the material of the resin substrate, acrylic resins such as polycarbonate or polymethyl methacrylate, vinyl chloride resins such as polyvinyl chloride, or vinyl chloride copolymer, epoxy resins, amorphous polyolefins, polyesters or the like may be used. Among those. polycarbonate is preferred in view of the humidity resistance, dimensional stability, cost and/or the like. Flash on the product should be removed by varnishing or polishing. The height of the protrusion on the resin substrate is preferably 50 to 1000 nm and more preferably 200 to 500 nm.

A magnetic layer is provided over the fine pattern on the surface of the resin substrate in the similar manner, thereby obtaining a master information carrier.

A master information carrier may be obtained, for instance, by a photolithography instead of the stamper method. For example, a photoresist layer is formed on a smooth surface of a flat plate, and the photoresist layer is exposed to light through a photo mask formed according to the pattern of a servo signal. Thereafter the photoresist layer is developed to obtain a pattern of photoresist corresponding to the information to be transferred, and then the plate is etched to form grooves (recessed portions) in a depth corresponding to the thickness of the magnetic layer. Then the photoresist remaining on the plate is removed, thereby obtaining a master information carrier substrate. A magnetic layer is provided over the fine pattern on the surface of the master information carrier substrate in the similar manner, thereby obtaining a master information carrier.

How to make the center plane mean surface roughness SRa of the contact parts 3a of the master information carrier in the range described above will be described, hereinbelow.

Further, in the case where the original is formed according to the stamper method or the irregularity pattern of the substrate of the master information carrier is formed in the steps including patterning of photoresist by lithography and removal (washing) of photoresist, residual photoresist remaining on parts which finally become top surfaces of the protruding portions (or parts which finally become surfaces opposed to the top surfaces of the protruding portions) affects the center plane mean surface roughness of the top surfaces of the protruding portions, and accordingly, the center plane mean surface roughness SRa can be controlled by controlling the degree of washing of the photoresist. For example, by enhancing the degree of washing of the photoresist, the center plane mean surface roughness SRa can be reduced. Accordingly, the center plane mean surface roughness SRa of the contact parts 3a of the master information carrier can be controlled to the range described above by controlling the degree of washing of the photoresist.

When a patterned substrate formed by magnetic material such as Ni is employed as a master information carrier to itself, the center plane mean surface roughness SRa the parts of such a substrate which are brought into contact with the magnetic recording medium is controlled to the range described above. Whereas, in the case where a magnetic layer and/or a protective layer is formed on the substrate, the center plane mean surface roughness SRa of the parts of the uppermost layer which are brought into contact with the magnetic recording medium is controlled to the range described above.

That is, in a second embodiment shown in FIG. 2, the master information carrier 3 comprises a patterned substrate 31 and a magnetic layer 32 formed on the substrate 31. The contact parts 3a of the master information carrier 3 of the second embodiment are in the range of 0.3 nm to 10.0 nm in center plane mean surface roughness SRa. The center plane mean surface roughness SRa of the contact parts 3a can be controlled to the range described above by controlling, for instance, magnetic layer forming conditions such as the flow rate of Ar, the output power and/or the film forming thickness during sputtering.

In the case where a protective layer and/or the like is formed on the magnetic layer, the center plane mean surface roughness SRa of the parts of the uppermost layer which are brought into contact with the magnetic recording medium is controlled to the range described above.

Further, by forming the magnetic layer and a protective layer (and/or the like) on the upper surfaces of the protruding portions of the irregularity pattern after texturing the upper surfaces of the protruding portions of the irregularity pattern by polishing, by the use of a laser beam, or by applying particulate material such as $SiO_2$, the center plane mean surface roughness SRa of the contact parts can be controlled to the range described above.

When the magnetic transfer described above is carried out by the use of the master information carrier of the present invention, air is readily purged from between the master information carrier and the magnetic recording medium when they are brought into close contact with each other by virtue of the center plane mean surface roughness SRa of the contact parts, whereby satisfactory close contact between the master information carrier and the magnetic recording medium can be obtained and the information carried by the master information carrier is well transferred to the magnetic recording medium.

Basic steps of magnetic transfer by the use of the master information carrier in accordance with the present invention will be described with reference to FIGS. 3A to 3C, hereinbelow. In FIGS. 3A to 3C, only the lower side of a slave medium (a magnetic recording medium) 2 is shown.

An initial magnetic field Hin is first applied to the slave medium 2 in one direction parallel to the recording tracks thereof, thereby initially magnetizing the magnetic layer of the slave medium 2 in said one direction as shown in FIG. 3A. Thereafter, the information side of the master information carrier 3 carrying thereon the irregularity pattern is brought into a close contact with the recording surface of the slave medium 2. In this state, a transfer magnetic field Hdu is applied in the direction opposite to the initial magnetic field Hin as shown in FIG. 3B, thereby magnetically transferring the information on the master information carrier 3 to the slave medium 2. As a result, information (e.g., a servo signal) corresponding to the irregularity pattern on the master information carrier 3 is magnetically recorded on the recording surface of the slave medium 2 as shown in FIG. 3C.

Information may be transferred to opposite sides of the slave medium 2 simultaneously or side by side in sequence.

In the case where the irregularity pattern representing information to be transferred is a negative pattern reverse to the positive pattern shown in FIGS. 3A to 3C, the information can be magnetically transferred to the slave medium 2 by reversing the directions of the initial DC magnetic field Hin and the transfer magnetic field Hdu. The intensities of the initial DC magnetic field and the transfer magnetic field are determined on the basis of the coercive force of the slave medium, the specific permeabilities of the master information carrier and the slave medium, and the like.

In this specification, the center plane mean surface roughness SRa is defined by measuring center plane mean surface roughness SRa with SPA500 available from SEIKO INSTRUMENTS in DFM mode (tapping mode) with a measuring probe AR-5 used and with the measuring range, the number of scanning lines and the scanning speed set to 2.5 $\mu m^2$, 512×512 and 2 Hz, respectively.

[Experiment]

In order to prove the effect of the invention, releasability from the slave medium and the quality of the transferred signal were evaluated after the magnetic transfer using master information carriers in accordance with the present invention (embodiments 1 and 2) and not in accordance with the present invention (comparative examples 1 to 3). The result was reported in the following table.

The releasability were evaluated in the following manner. That is, a slave medium was bonded to one of a pair of plates by adhesive and a master information carrier was held against the surface of the other of the plates by a strong magnet. Then the plates were moved toward each other so that the information side of the master information carrier and the recording surface of the slave medium are brought into contact with each other and then the master information carrier and the slave medium were pressed against each other under a pressure equivalent to that under which they were pressed against each other during the magnetic transfer. Thereafter, one end of one of the plates were lifted in perpendicular to the surface of the other plate about the other end of said one of the plates. The force required to separate the master information carrier and the slave medium from each other was measured by the use of a spring scale. With tensile force required to separate a master information carrier whose SRa was 0.05 nm taken as 1, the releasability of the master information carrier was evaluated to be acceptable (◯) when the measured tensile force was not larger than 0.3 and to be unacceptable (X) when the measured tensile force was larger than 0.3.

The quality of the transferred signal was evaluated in the following manner. That is, distortion of the transferred signal was measured by an electromagnetic conversion property meter (SS-60 from Kyodo Electronics). An inductive head which was 0.23 μm in head gap and 3.0 μm in track width was used and reproduced signal (TAA) was measured. When a reproduction output not lower than 0.8 mV was obtained, the quality of the transferred signal was evaluated to be acceptable (◯), when a reproduction output lower than 0.8 mV was obtained, the quality of the transferred signal was evaluated to be unacceptable (X).

The center plane mean surface roughness SRa was measured with SPA500 available from SEIKO INSTRUMENTS in DFM mode (tapping mode) with a measuring probe AR-5 used and with the measuring range, the number of scanning lines and the scanning speed set to 2.5 $\mu m^2$, 512×512 and 2 Hz, respectively.

The master information carriers employed in this experiment, embodiments 1 and 2 and comparative examples 1 to 3, will be described hereinbelow.

The master information carrier of the embodiment 1 (emb. 1) was prepared in the following manner. A photoresist layer was formed on a glass substrate and was exposed to light in a pattern representing information to be transferred. Thereafter the photoresist layer was developed and the photoresist of the exposed part was removed, whereby the glass substrate was provided on its surface with an irregularity pattern of photoresist. Then the glass substrate was plated with Ni, whereby a nickel substrate having an irregularity pattern on its surface was obtained. Then a magnetic layer was formed on the irregularity pattern by sputtering. The sputtering conditions were 1.8 W/cm², 133 mPa (1.0 mTorr) and 100 nm in introduced power, Ar pressure and thickness of the magnetic layer. The master information carrier of the embodiment 1 was 0.43 nm in center plane mean surface roughness SRa.

The master information carrier of the embodiment 2 (emb. 2) was prepared in the same manner as the embodiment 1 except that the sputtering conditions were 3.0 W/cm², 199.5 mPa (1.5 mTorr) and 300 nm in introduced power, Ar pressure and thickness of the magnetic layer. The master information carrier of the embodiment 2 was 9.70 nm in center plane mean surface roughness SRa.

The master information carrier of the comparative example 1 (ex. 1) was prepared in the following manner. A photoresist layer was formed on a glass substrate and was exposed to light in a pattern representing information to be transferred. Thereafter the photoresist layer was developed and the photoresist of the exposed part was removed, whereby the glass substrate was provided on its surface with an irregularity pattern of photoresist. Then the glass substrate was etched using the photoresist as a mask to form holes in the glass substrate and the photoresist was removed, thereby obtaining a glass substrate having on its surface an irregularity pattern. Then a magnetic layer was formed on the irregularity pattern by sputtering. The sputtering conditions were 3.0 W/cm², 199.5 mPa (1.5 mTorr) and 360 nm in introduced power, Ar pressure and thickness of the magnetic layer. The master information carrier of the comparative example 1 was 10.8 nm in center plane mean surface roughness SRa.

The master information carrier of the comparative example 2 (ex. 2) was prepared in the same manner as the embodiment 1 except that the sputtering conditions were 4.6 W/cm², 438.9 mPa (3.3 mTorr) and 370 nm in introduced power, Ar pressure and thickness of the magnetic layer. The master information carrier of the comparative example 2 was 21.3 nm in center plane mean surface roughness SRa.

The master information carrier of the comparative example 3 (ex. 3) was prepared in the same manner as the embodiment 1 except that the sputtering conditions were 1.0 W/cm², 26.6 mPa (0.2 mTorr) and 70 nm in introduced power, Ar pressure and thickness of the magnetic layer. The master information carrier of the comparative example 3 was 0.2 nm in center plane mean surface roughness SRa.

TABLE

|        | SRa (nm) | releasability | signal quality |
|--------|----------|---------------|----------------|
| emb. 1 | 0.43     | ○             | ○              |
| emb. 2 | 9.70     | ○             | ○              |
| ex. 1  | 10.8     | ○             | X              |
| ex. 2  | 21.3     | ○             | X              |
| ex. 3  | 0.20     | X             | ○              |

As can be understood from the table, the master information carriers of the embodiments 1 and 2, where the parts of the surface of the master information carrier which is brought into contact with the magnetic recording medium were in the range of 0.3 nm to 10.0 nm in center plane mean surface roughness SRa, were acceptable in both the releasability and the signal quality, whereas, the master information carriers of the comparative examples 1 to 3, where the parts of the surface of the master information carrier which is brought into contact with the magnetic recording medium were out of the range of 0.3 nm to 10.0 nm in center plane mean surface roughness SRa, were unacceptable in one of the releasability and the signal quality.

What is claimed is:

1. A master information carrier having on a surface thereof an irregularity pattern representing information to be magnetically transferred to a magnetic recording medium held in contact with the surface of the master information carrier, wherein
   the parts of the surface of the master information carrier which are brought into contact with the magnetic recording medium are in the range of 0.3nm to 10.0 nm in center plane mean surface roughness SRa.

2. A master information carrier as defined in claim 1 in which the center plane mean surface roughness SRa is in the range of 0.5 nm to 5.0 nm.

3. A master information carrier as defined in claim 2 in which the center plane mean surface roughness SRa is in the range of 0.5 nm to 3.0 nm.

4. A master information carrier as defined in claim 1 in which said irregularity pattern is formed on a metal substrate and the depth of the irregularity pattern of the metal substrate is 50 nm to 800 nm.

5. A master information carrier as defined in claim 4 in which the depth of the irregularity pattern of the metal substrate is 80 nm to 600 nm.

6. A master information carrier as defined in claim 1 in which said irregularity pattern is formed on a metal substrate and the metal substrate is provided with a magnetic layer on the irregularity pattern.

7. A master information carrier as defined in claim 6 in which the thickness of the magnetic layer is 50 nm to 500 nm.

8. A master information carrier as defined in claim 7 in which the thickness of the magnetic layer is 150 nm to 400 nm.

9. A master information carrier as defined in claim 1 in which said irregularity pattern is formed on a resin substrate and the depth of the irregularity pattern of the resin substrate is 50 nm to 1000 nm.

10. A master information carrier as defined in claim 9 in which the depth of the irregularity pattern of the resin substrate is 200 nm to 500 nm.

11. A master information carrier as defined in claim 1 in which said irregularity pattern is formed on a resin substrate and the resin substrate is provided with a magnetic layer on the irregularity pattern.

12. A master information carrier as defined in claim 11 in which the thickness of the magnetic layer is 50 nm to 500 nm.

13. A master information carrier as defined in claim 12 in which the thickness of the magnetic layer is 150 nm to 400 nm.

* * * * *